Sept. 9, 1930.  F. FELLOWS  1,775,238
AUXILIARY AIR FEED FOR INTERNAL COMBUSTION ENGINES
Filed Aug. 20, 1926  2 Sheets-Sheet 1

Inventor
F. Fellows
by E. J. Fetherstonhaugh.
Attorney.

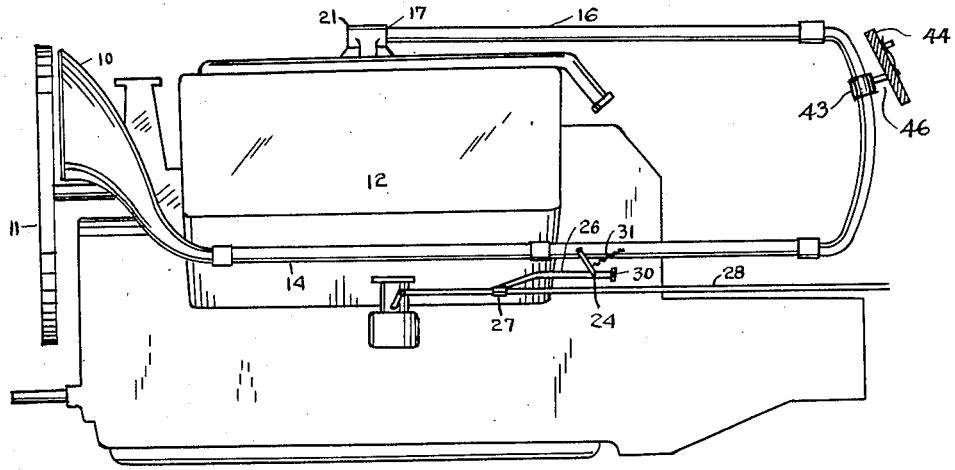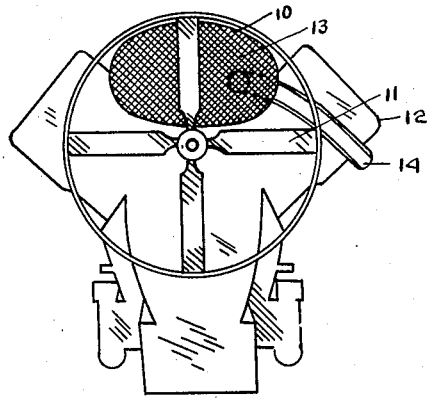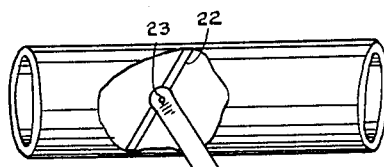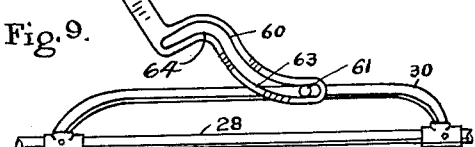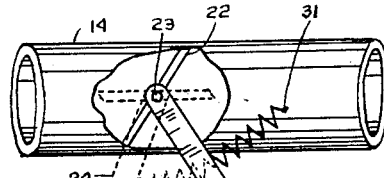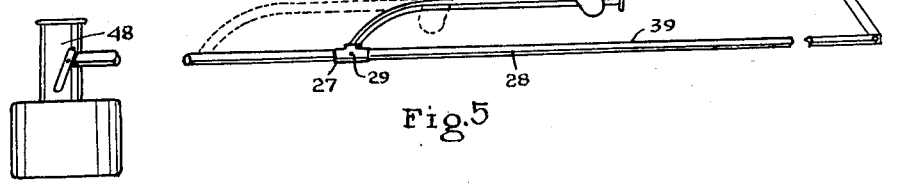

Patented Sept. 9, 1930

1,775,238

UNITED STATES PATENT OFFICE

FRANK FELLOWS, OF MONTREAL, QUEBEC, CANADA, ASSIGNOR OF ONE-HALF TO THOMAS BASSETT MACAULAY, OF MONTREAL, CANADA

AUXILIARY AIR FEED FOR INTERNAL-COMBUSTION ENGINES

Application filed August 20, 1926. Serial No. 130,463.

The invention relates to an auxiliary air feed for internal combustion engines, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to induce fresh air into the gas feed of the engine for the purpose of reducing the richness of the mixture, which should vary inversely with the speed of the engine; to economize in the consumption of fuel oil by increasing the air feed regularly and thereby obtain the maximum mileage per gallon of gasoline or other fuel and excellent running conditions; to afford an air feed universally applicable to interial combustion engines; to maintain the engine in good condition and reduce the deposit of carbon within the cylinders, thus reducing the cost of maintenance; and generally to provide engine equipments in motor cars, trucks and other motor driven vehicles and in all machinery run by internal combustion engines that will insure economy without the loss of efficiency.

In the drawings, Figure 1 is a plan view of a gasoline engine showing the application of the invention under pressure draft conditions.

Figure 3 is a front elevation of the engine showing the blower mouth.

Figure 4 is a side elevation of Figure 1.

Figure 5 is a detail of the automatic valve mechanism.

Figure 8 is a front sectional view of the automatic valve mechanism.

Figure 9 is an elevation of an alternative to the automatic valve mechanism shewn in Figures 5 and 8.

Like numerals of reference indicate corresponding parts in the various figures.

Figure 1:
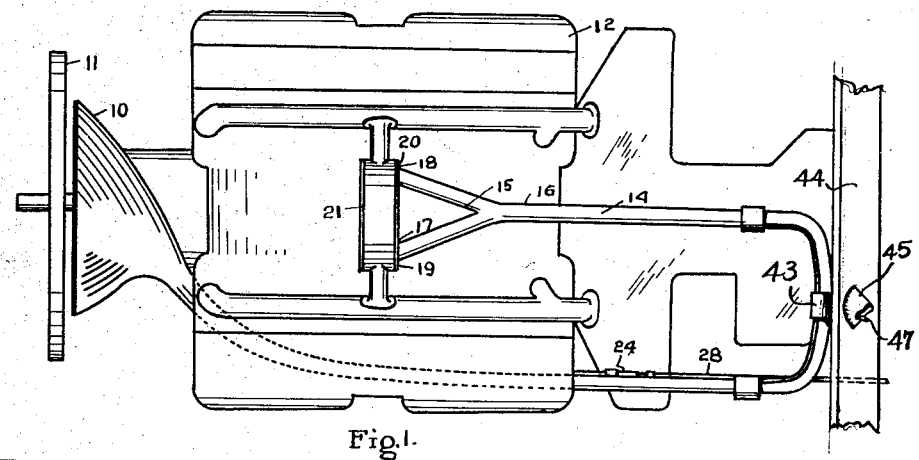

The principle of the device is an arrangement by which auxiliary air received from outside the engine shall be conducted through a pipe to an inlet in the intake manifold located anywhere between the throttle and the engine. This pipe 14 is preferably several feet in length and is required in order to provide that such air shall be supplied evenly and without "gulps". The length of the pipe produces a certain amount of inertia in the air within it which has to be overcome before there can be any alteration in the speed of passage of the auxiliary air through the pipe either in the way of increase or decrease. The inertia of the air in the pipe will cause any increase in the intake of air through the pipe to lag somewhat behind the throttle movements. Irregularity in the rate of intake is a very serious difficulty in connection with any attempt to introduce such auxiliary air through a pipe of sufficient length. The degree to which the entrance of auxiliary air will lag behind the throttle movements will be in proportion to the length of pipe through which it has to pass, and this length may be regulated as desired.

The pipe 14 will preferably be attached in close proximity to the engine 12, so that the air within it will be automatically warmed before delivery.

The intake of the auxiliary air pipe may be located anywhere and may be of any type.

Preferably, however, the intake to the pipe for the entrance of the auxiliary air will be in the form of a bell-shaped orifice 10 having a suitable screen 13 if desired and this bell-shaped orifice will be so located as to open towards the front of the car, in order that when the car will be in motion air will be automatically delivered to the intake under pressure as a result of the car pushing its way through the exterior air, the degree of such pressure automatically varying with the speed of the car.

To still further increase the efficiency of the auxiliary air pipe and to render it yet more automatic in operation, it is desirable to place the bell-shaped intake already referred to immediately behind and close to the cooling fan 11 and wholly or partly within the stream of air delivered by the fan, which when revolving rapidly will deliver air to the intake and through it to the pipe, under still greater pressure, varying automatically with the rate of revolution of the fan which varies directly with the speed of the engine.

To regulate the maximum amount of auxiliary air which can pass through the pipe, a butterfly valve 43 or other valve device should be placed at some point along the course of said pipe. This valve may or may not be operated by a control within the reach of the driver, but it is desirable that it be so operated. A convenient arrangement is to bring the pipe close to the dash and to locate the valve at that point where it can be attached to a control mechanism on the dash. This provides not merely the desired length of pipe, but also allows of complete and immediate mechanical control by the driver.

To make the device still more automatic in action, a second butterfly valve 22 can be placed at some other point along the course of said pipe. This valve should be automatic in its action and arranged to be actuated directly from the throttle-control gear so that after the throttle has reached a predetermined degree of opening, the auxiliary air valve will automatically open with it. Similarly as the throttle valve closes the auxiliary air valve will close with it until it is fully closed when the throttle valve has reached the aforesaid partial degree of opening.

The delivery section 16 of the auxiliary air feed pipe 14 leads from the yoke end 15 to the discharge 17 and 18 formed by the Y-end and directed to the intakes 19 and 20 of the manifold 21, though it must be understood that where there is a single manifold the Y-end is quite unnecessary.

It will thus be seen that a clear passage for air is provided through the air inlet, the air inlet pipe, the yoke end connection and the delivery section of the pipe and consequent upon the suction of the engine and the air pressure developed by the speed of the vehicle and the action of the fan, a considerable volume of air is delivered to the mixture drawn from the carbureter, which consequently lightens the mixture which is actually consumed by the engine; also it will be seen that the auxiliary air supply is partially proportional to the increase in speed, as the rapid revolution of the fan and speed of the vehicle is accountable for a correspondingly larger volume of air being supplied.

A greater control of this auxiliary air feed is furnished by the manually controlled valve 43 and a still greater control of this auxiliary air feed is furnished through the aforementioned automatic valve 22 or other form of automatic controlling valve. The stem 23 projects radially through the pipe 14 and the arm 24 forming the operating lever is securely mounted thereon and projects radially therefrom at the properly adjusted angle in relation to the setting of said valve.

The arm 24 is slotted longitudinally at 25 and fixedly secured to said stem 23 and is operated by the rod 26 projecting through the slot 25 and slidably mounted thereon.

The rod 26 extends rearwardly from the collar 27 which is mounted on the throttle-control rod 28 and fixedly held to its adjusted position by the set screw 29, said rod 26 having at its other end the lug 30 appreciably to the rear of the slot 25 in the arm 24 when the butterfly valve 22 is in its fully closed position. The lug 30 engages the slot 25 on reaching the same and increases the opening of the said valve as the engine is accelerated and thus effects the swinging of the arm 24 and consequently the rotation of the valve which is brought back to its original adjusted position by the spring 31 secured at its ends to the lever arm 24 and air pipe 14 respectively.

Figure 2:
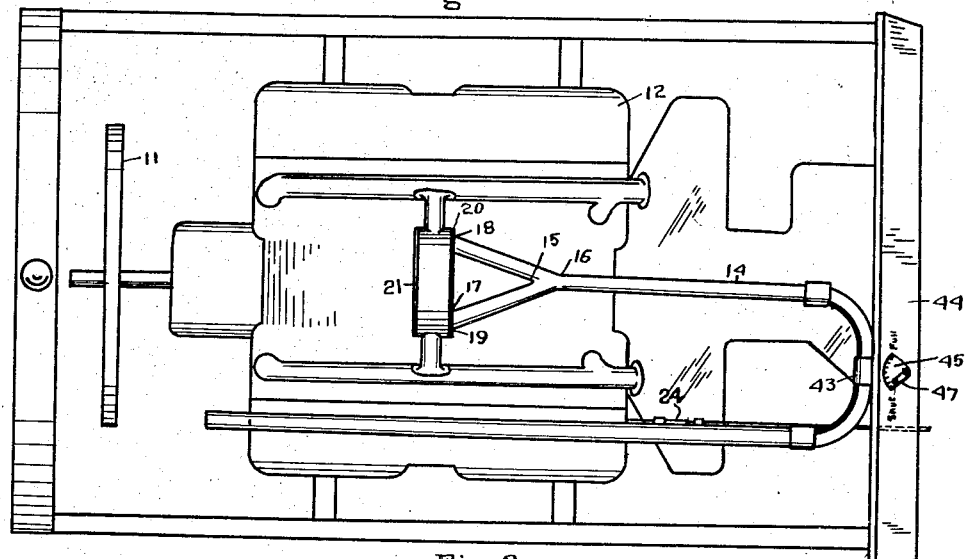
Figure 2 is a plan view of the invention and engine showing another manner of applying it without pressure draft.
Figures 6, 7:
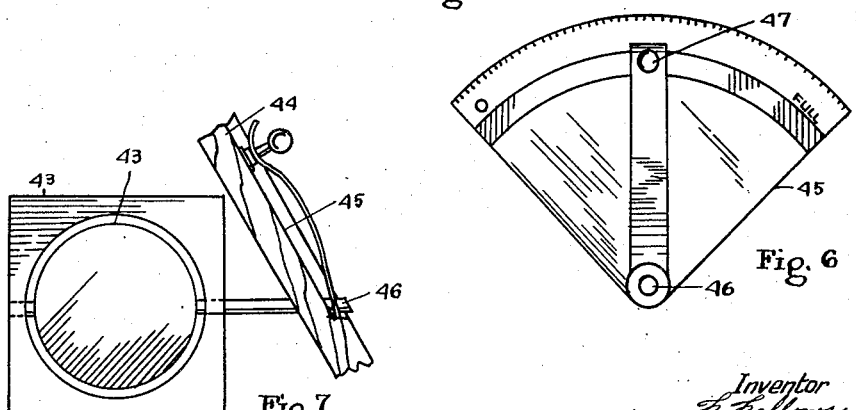
Figure 6 is a detail of the manually operated valve mechanism.
Figure 7 is a sectional detail of the manually operated valve mechanism.

In Figure 2 the yoke end 15 of the air inlet passage extends into a casing containing the valve 43 behind the instrument board 44 on which the dial 45 is situated and through which the valve stem 46 extends to which stem is fixed the operating lever 46 which operates over the dial 45, the latter being preferably in quadrant form. The operating lever 46 may be spring or friction held to its various positions and is operated by the knob 47 or other suitable handle and this valve 43 may be substituted for or used in conjunction with the automatic operating valve 22 operatively attached to the throttle control rod.

The throttle-control rod 28 is operatively connected to the throttle valve of the carbureter 48 at one end and at the other end to the control lever 49, therefore on starting the engine there is no opening of the automatic air valve 22 until the throttle is appreciably opened.

The speed of the car and the rapidity of the revolution of the cooling fan will automatically regulate the intake of the air through the pipe, and the pipe of sufficient length, will automatically insure its gradual and even delivery to the manifold. This is all the regulation that will be required under ordinary circumstances, but it may be necessary that the driver should be able to shut off the auxiliary air completely when he is about to stop the car, and to leave it closed until he shall have got his car again well under way.

When the throttle valve is closed, or nearly so, the valve 22 in the auxiliary air pipe is completely closed and will remain closed, even after the throttle valve will have begun to open, until the throttle valve will have been opened to a predetermined degree, after which point, as the throttle valve will open more fully, this second auxiliary air valve will also automatically open, reaching the condition of being completely opened at a predetermined point short of the complete opening of the throttle valve.

By this arrangement no auxiliary air is admitted when the car is slowing down preparatory to stopping or when it is stopped, thus preventing the filling of the manifold with air or with a diluted mixture which would interfere with the ease of the subsequent starting. In like manner no auxiliary air is admitted immediately on the starting of the car, or when it is being driven at a slow speed, as in crowded streets, at which time it is desirable to have a mixture of full strength. When the auxiliary air valve opens sufficiently to admit auxiliary air, the auxiliary air comes in gradually and evenly and at a warm temperature, as a result of having to pass through the pipe the details and operation of which have already been explained.

The automatic valve 22 in the auxiliary air pipe just referred to will not necessarily replace the valve 43 in the said pipe, for the valve 43 will usually be required to regulate the maximum amount of auxiliary air which can pass through the pipe when the valve 22 is opened to its fullest extent, the second valve 22 and its automatic control however will make it less necessary or desirable to have said primary hand valve controlled from the dash.

In Figure 9 the stud 61 on the rod 30 engages the S-shaped slot 60 in the end of the arm 24. The cam action obtained from the shape of the slot is such that small throttle openings will have no effect upon the arm 24 until the stud reaches the pawl 63 in the slot. The arm will then open with the throttle until the point 64 is reached when the valve is fully open and further throttle opening will only result in the stud sliding in the circumferential portion of the slot beyond 64.

What I claim is:—

In an auxiliary air feed for internal combustion engines, a tubular air passage directed to the fuel intake of the engine and comprising piping in long and shorter lengths spaced and connected at their inner ends by a communicating pipe, a valve in said long length cooperative with the engine valve gear and a valve in said communicating pipe forming a volume adjusting member apart from the cooperative valve.

Signed at Montreal, Canada, this 29th day of June, 1926.

FRANK FELLOWS.